June 22, 1965  T. F. HAUF  3,190,758
FORMING AND PACKAGING OF PIE CRUST
Filed Jan. 30, 1963  3 Sheets-Sheet 1

INVENTOR.
THEODORE F. HAUF
BY
Andrus & Starke
Attorneys

June 22, 1965  T. F. HAUF  3,190,758
FORMING AND PACKAGING OF PIE CRUST
Filed Jan. 30, 1963  3 Sheets-Sheet 2

INVENTOR.
THEODORE F. HAUF
BY
Andrus & Starke
Attorneys

June 22, 1965   T. F. HAUF   3,190,758
FORMING AND PACKAGING OF PIE CRUST
Filed Jan. 30, 1963   3 Sheets-Sheet 3

INVENTOR
THEODORE F. HAUF
BY Andrus & Starke
Attorneys

3,190,758
FORMING AND PACKAGING OF PIE CRUST
Theodore F. Hauf, Milwaukee, Wis., assignor to Robert A. Johnston Company, Milwaukee, Wis., a corporation of Wisconsin
Filed Jan. 30, 1963, Ser. No. 255,003
8 Claims. (Cl. 99—172)

This invention relates to forming and packaging of pie crust and more particularly to a novel method of preparing certain types of pie crusts for sale in pre-packaged form to the user.

The last decade has seen a large growth in new forms of food packaging. Pre-prepared mixes and the like have become commonplace. Bakery products have shared in this growth, and it is now possible to purchase complete pre-packaged pies and the like which are sealed and will keep without spoilage for extended periods.

Boxed pie fillings are also available for use by consumers, such as bakeries and housewives.

The present invention is directed to the manufacture of a pre-formed and pre-packaged pie crust which is supplied in a suitable pie container and ready for subsequent filling by the consumer.

In particular the invention contemplates a pie crust of edible material, such as a graham cracker mix. In accordance with the invention, a predetermined amount of the crust mix is placed in a conventional pie container and then subjected to centrifugal force so that it flows uniformly outwardly from the center to cover the interior of the container. The container and formed crust are then sealed.

The accompanying drawings illustrate the best mode presently contemplated by the inventor for carrying out the invention.

Figure 1:
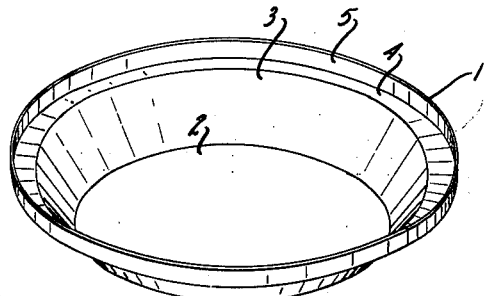
FIGURE 1 is a perspective view of a pie pan usable in accordance with the invention.

As shown in FIGURE 1 of the drawings, the invention contemplates utilization of a suitable circular pie pan 1 having a flat bottom 2 which merges into an outwardly tapered annular side wall 3 which in turn merges into an annular flat rim 4. A vertical annular flange 5 extends around the outer edge of rim 4 for purposes to be described. Pan 1 may be of any suitable material, that shown being of relatively light-weight flexible aluminum.

Figure 2:
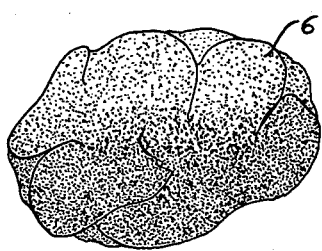
FIG. 2 is a perspective view of a quantity of pie crust material.

In accordance with the invention, an edible pie crust material 6 (FIG. 2) is provided for disposal in contiguous relationship with the inner surface of pan 1. To function properly, crust material 6 should be relatively dry, non-sticky and flowable; as contrasted with quite moist sticky doughs. It has been found that a crust mix having the following ingredients and proportions by weight is entirely suitable: graham cracker meal, 42⅓ parts; fine granulated sugar, 13 parts; and liquified shortening, 11 parts.

Such a mix formula is sometimes called a "medium-damp loose agglomeration." However, it actually has only a 3%–4% moisture content by weight and for purposes of this invention will be called dry. In addition, while the particles of the mix formula are separate and identifiable, the mix is not considered to be free flowing since the particles tend to bridge over and cling together. The mix is nevertheless flowable from one position to another.

Figure 3:
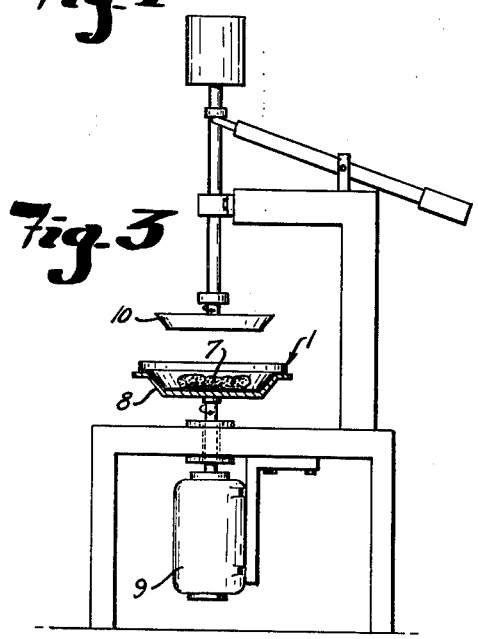
FIG. 3 is a side elevation of an apparatus showing the arrangement for practicing a first embodiment of the invention, and with parts broken away in section.
Figure 4:
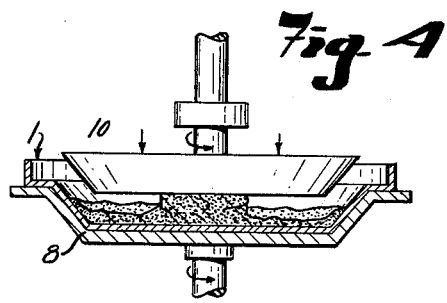
FIG. 4 is an enlarged fragmentary vertical central section showing the pie crust material flowing outwardly during operation of the apparatus of FIG. 3.

The method of the invention contemplates positioning a predetermined quantity of the particlized crust material 6 in a heap or mound 7 in the center of bottom 2 of pan 1, as shown in FIG. 3. Subsequently mound 7, which is already confined at the bottom, is also confined at the top and then subjected to centrifugal force.

For this purpose, and as shown in FIGS. 3–6, pan 1 is fixedly secured on a pie pan shaped turntable 8 which is adapted to be rotatably driven by a motor 9. A freely rotatable mandrel 10 having a configuration which complements the interior of pan 1 is then brought downwardly into the pan and into pressure contact with mound 7.

Actuation of motor 9 will cause pan 1 and mandrel 10 to rotate, with the mound confined therebetween. The centrifugal force produced by rotation of the assembly will cause the crust material to flow outwardly along the pan bottom and then upwardly along its sides so that it takes the final form of a pie crust and is thus deformed into the substantial configuration of the pan. The thickness of the crust will depend on the amount of material 6 supplied and the amount of continuous pressure applied thereon by the mandrel.

Figure 5:
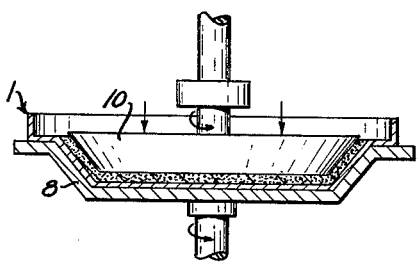
FIG. 5 is a view similar to FIG. 4 and showing the position of the finally formed pie crust.
Figure 6:
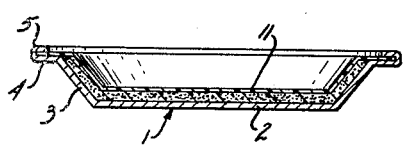
FIG. 6 is a vertical central section through a completed package, and showing the sealing lid.
Figure 7:
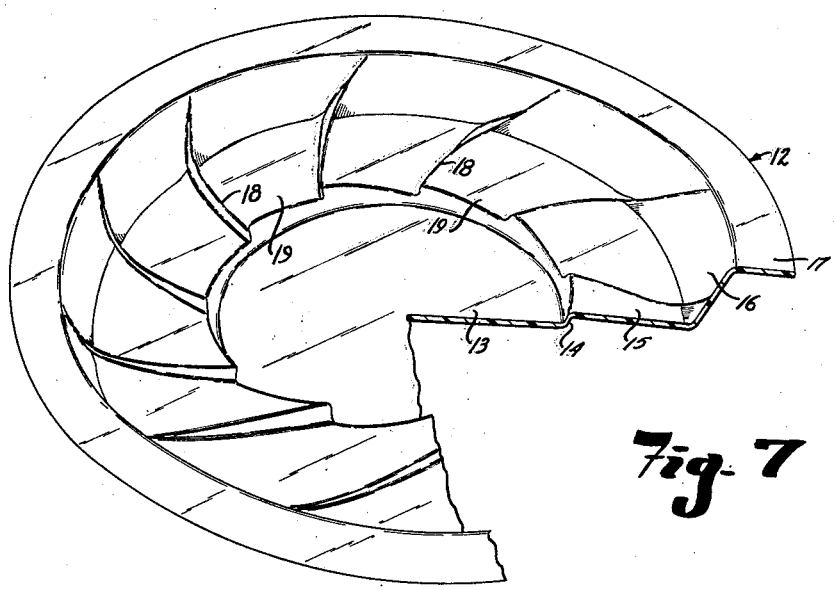
FIG. 7 is a perspective view of a lid which may be used in a second embodiment of the invention, with a part removed.
Figures 8, 9:
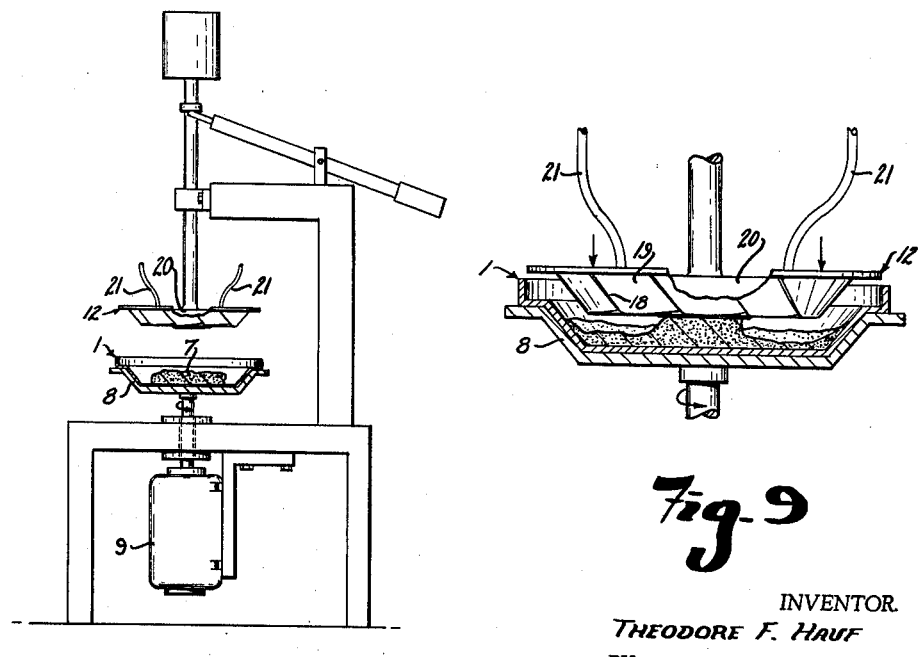
FIG. 8 is a side elevation of an apparatus showing the arrangement for practicing a second embodiment of the invention, and with parts broken away in section.
FIG. 9 is an enlarged fragmentary vertical central section showing the pie crust material flowing outwardly during operation of the apparatus of FIG. 8.
Figure 10:
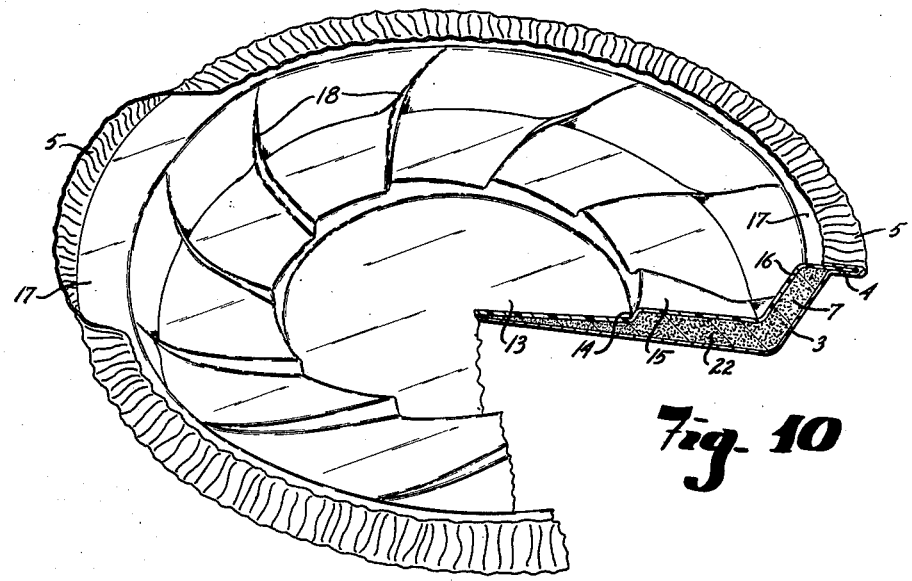
FIG. 10 is a perspective view of a completed package constructed in accordance with the second embodiment and with parts exposed and removed.

When the crust is completely formed, as in FIG. 5, motor 9 is shut off, mandrel 10 raised and pan 1 removed. A preformed lid 11 is then placed over the pan and flanges 5 crimped down to seal the package. Lid 11 is shown as generally complementing the interior configuration of the pan. (See FIG. 6.)

In the embodiment described above, it is possible to drive the mandrel and permit the turntable to freely rotate; or to hold either the pan or mandrel stationary while rotating only the other element and without departing from the spirit of the invention. The mechanism shown can be operated manually or in some other suitable way.

Another embodiment of the invention is shown in FIGS. 7–10. In this instance, a pan lid 12, somewhat similar to lid 11, is utilized during the application of centrifugal force. Lid 12 is preferably made of semi-rigid clear plastic, such as polystyrene, and which has very smooth surfaces. The shape of lid 12 is generally similar to pan 1, but is slightly shallower. The lid bottom is provided with a central depression 13 which forms an upwardly extending annular ridge 14, which in turn merges into a very slightly upwardly tapering outer bottom portion 15. The latter merges into the outwardly tapered lid side wall 16 and hence to the flat rim 17 which ultimately rests on rim 4 of the pan.

As shown, lid 12 is provided with a plurality of circumferentially spaced radially extending curved ridges or flutes 18 which extend along portion 15 and side wall 16. Flutes 18 provide a number of vanes 19 in the pan, for purposes to be described.

It is also possible to provide a spiral form of ridge without departing from the spirit of the invention.

Lid 12 is secured to a non-rotatable mandrel 20, as by a vacuum force supplied from a suitable source through tubes 21. A mound 7 of a crust matrial is again placed in the center of pan 1. Motor 9 is actuated to rotate turntable 8 and mandrel 20 is lowered to enter the pan. In this instance, the centrifugal force will be assisted by flutes 18 and vanes 19 which will mechanically drive the confined crust material outwardly and upwardly.

Due to the pan shape, the space of material confinement increases radially outwardly and is at a maximum between the walls 3 and 16. This diminishing restriction 22 contributes to the outward flowability of the material.

When the crust is fully formed, motor 9 is shut off and mandrel 20 released from the lid which now is in contiguous confining contact with the crust. Flange 5 is then folded tightly over rim 17. Flutes 18 will subsequently function to increase the lid rigidity of the finished package and thereby assist in maintaining the shape of the crust.

Here, again, it is possible to hold the turntable stationary and rotatably drive the mandrel and lid without departing from the spirit of the invention. Both the turntable and the mandrel and lid assembly might also rotate together.

Figure 11:
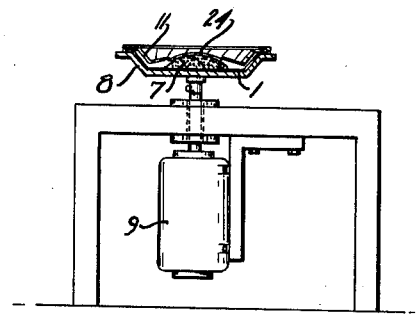
FIG. 11 is a side elevation of an apparatus showing the arrangement for practicing a third embodiment of the invention, and with parts broken away in section.
Figure 12:
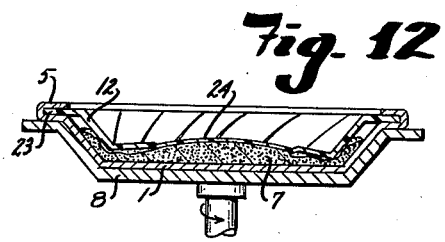
FIG. 12 is an enlarged fragmentary vertical central section showing the pie crust material flowing outwardly during operation of the apparatus of FIG. 11.
Figure 13:
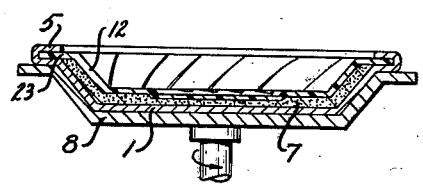
FIG. 13 is a perspective view of a completed package constructed in accordance with the third embodiment and with parts removed.

In the embodiment shown in FIGS. 11–13, mound 7 is again placed in the pan center. A lid 12 is brough down over the pan and its rim 23 sealed by crimping over flange 5. Mound 7 will cause the lid bottom to bulge upwardly, as at 24. Since the plastic material is semi-rigid and does not stretch appreciably, the lid bottom will apply a slight downward pressure on the confined mound. Upon rotation of the assembly on turntable 8, the material 6 will flow outwardly as before and the pressure of the lid bottom will assist the centrifugal force until the bulge subsides and the lid takes its usual final shape.

Figure 14:
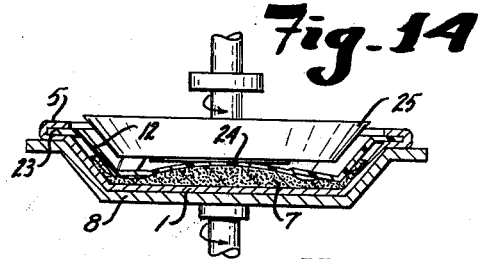
FIG. 14 is a view similar to FIG. 12 and showing the same embodiment with the addition of a mandrel.

The embodiment shown in FIGS. 11–13 does not utilize a mandrel. However, it has been found that if the gauge of lid 12 is too light, the crust material will tend to flow too much to the outside, leaving too thin a crust in the middle. In such case, and as shown in FIG. 14, a mandrel 25 is utilized in addition to the bulge. This has been found to eliminate the problem, if it exists.

In the various embodiments shown and described, it has found that a crust mix temperature of about 70° F. facilitates performance of the method. It has also been found that complete formation of the finished crust from the initial mound can be accomplished in a total elapsed time of about five seconds from start to stop of pan rotation, when a maximum rotative speed of about 750 r.p.m. is used. When a mandrel is utilized, about 70 lb./sq. in. of pressure has been found to be entirely adequate.

The invention provides a novel method of forming prepackaged pie crusts and the like. The various combinations of centrifugal force, downward pressure and flutes permit formation of the crust driectly in its own pan at very high speeds. The lid seals the crust for storage and is easily and freely removable therefrom.

Various modes of carrying out the invention are contemplated as being within the scope of the following claims and particularly pointing out and distinctly claiming the subject matter which is regarded as the invention.

I claim:

1. The method of packaging a pie crust, comprising the steps of:
    (a) placing a mound of predetermined quantity of dry non-sticky flowable agglomerate pie crust material in the central portion of the bottom of a pie pan,
    (b) confining said mound between the pan and a lid conforming generally to the pan configuration
        (1) and with said lid having outwardly extending curved ridges therein,
    (c) providing relative rotation between said pan and said lid and simultaneous downward pressure on said lid to cause said material to flow outwardly from said mound to the edge portion of the pan so that the material is deformed substantially into the configuration of the pan,
    (d) and sealing said lid to said pan adjacent the edges thereof.

2. The method of claim 1 wherein:
    (a) the pan bottom is substantially flat and the lid bottom tapers slightly upwardly in an outward direction,
    (b) so that the confining restriction against outward flowing of the material decreases during rotation.

3. The method of packaging a pie crust, comprising the steps of:
    (a) placing a mound of predetermined quantity of dry non-sticky flowable agglomerate pie crust material in the central portion of the bottom of a pie pan,
    (b) confining said mound between the pan and a lid conforming generally to the pan configuration
    (c) rotating said pan and said lid and simultaneously applying downward pressure on said lid so that centrifugal force and the downward pressure will cause said material to flow outwardly from said mound to the edge portion of the pan so that the material is deformed substantially into the configuration of the pan,
    (d) and sealing said lid to said pan adjacent the edges thereof.

4. The method of claim 3 wherein:
    (a) the pan bottom is substantially flat and the lid bottom tapers slightly upwardly in an outward direction,
    (b) so that the confining restriction against outward flowing of the material decreases during rotation.

5. The method of packaging a pie crust, comprising the steps of:
    (a) placing a mound of predetermined quantity of dry non-sticky flowable agglomerate pie crust material in the central portion of the bottom of a pie pan,
    (b) confining said mound between the pan and a semi-rigid plastic lid conforming generally to the pan configuration so that the latter is bulged upwardly by the mound,
    (c) securing said bulged lid to the pan adjacent the edges thereof to form a sealed assembly,
    (d) and rotating said assembly while applying downward pressure thereto so that centrifugal force and the said downward pressure will cause said material to flow outwardly from said mound to the edge portion of the pan and be deformed substantially into the configuration of the pan and with a resultant subsiding of the bulge.

6. The method of packaging a pipe crust, comprising the steps of:
    (a) placing a mound of predetermined quantity of dry non-sticky flowable agglomerate pie crust material in the central portion of the bottom of a pie pan,
    (b) confining said mound between the pan and a semi-rigid plastic lid conforming generally to the pan configuration so that the latter is bulged upwardly by the mound, (1) said lid having outwardly extending curved ridges therein,
(c) providing relative rotation between said pan and said lid and simultaneously applying downward pressure on said lid so that centrifugal force, the downward pressure, and said ridges will cause said material to flow outwardly from said mound to the edge portion of the pan and be deformed substantially into the configuration of the pan and with a resultant subsiding of the bulge,
(d) and sealing said lid to the pan adjacent the edges thereof.

7. The method of forming and packaging a dry nonsticky flowable agglomerate material in contiguous relationship with the interior of a pan, comprising the steps of:
(a) placing a mound of said material in the bottom of said pan,
(b) confining said mound between said pan and a lid having outwardly extending curved ridges therein,
(c) causing relative rotation between said pan and lid so that centrifugal force and the mechanical action of said ridge will cause the material to move outwardly from said mound toward the edge portion of the pan so that the material is deformed into the configuration of the pan,
(d) and simultaneously with (c): applying a downward pressure on said material.

8. The method of forming and packaging a dry nonsticky flowable agglomerate material in contiguous relationship with the interior of a pan, comprising the steps of:
(a) placing a mound of said material in the bottom of a flat-bottomed pan,
(b) confining said mound between said pan and a lid having outwardly extending curved ridges therein and which tapers upwardly in an outward radial direction,
(c) causing relative rotation between said pan and lid so that centrifugal force and the mechanical action of said ridges will cause the material to flow outwardly from said mound through an area of decreasing restriction toward the edge portion of the pan and with said material being deformed substantially into the configuration of the pan,
(d) and simultaneously with (c): applying a downward pressure on said material.

References Cited by the Examiner

UNITED STATES PATENTS

| | | | |
|---|---|---|---|
| 2,691,337 | 10/54 | Forrest | 99—172 |
| 2,734,464 | 2/56 | Hallock et al. | 107—54.28 |
| 2,806,438 | 9/57 | Welch | 107—15.9 |
| 2,829,057 | 4/58 | Voelker | 99—172 |
| 2,989,932 | 6/61 | Egee et al. | 107—15.9 X |
| 3,071,087 | 1/63 | Krisky et al. | 107—15.9 |

FOREIGN PATENTS 23,642  1897  Great Britain.

A. LOUIS MONACELL, *Primary Examiner.*

NORMAN G. TORCHIN, *Examiner.*